(12) United States Patent
Yamamoto et al.

(10) Patent No.: US 9,249,034 B2
(45) Date of Patent: Feb. 2, 2016

(54) POSITIVE ELECTRODE ACTIVE SUBSTANCE PARTICLES AND PROCESS FOR PRODUCING THE SAME, AND NON-AQUEOUS ELECTROLYTE SECONDARY BATTERY

(75) Inventors: Manabu Yamamoto, Fukuoka-ken (JP); Daisuke Nishikawa, Fukuoka-ken (JP); Kazutoshi Ishizaki, Fukuoka-ken (JP); Kazuhiko Kikuya, Fukuoka-ken (JP); Teruaki Santoki, Fukuoka-ken (JP); Osamu Sasaki, Fukuoka-ken (JP); Hideaki Sadamura, Fukuoka-ken (JP)

(73) Assignee: TODA KOGYO CORPORATION, Hiroshima (JP)

( * ) Notice: Subject to any disclaimer, the term of this patent is extended or adjusted under 35 U.S.C. 154(b) by 915 days.

(21) Appl. No.: 13/497,628

(22) PCT Filed: Sep. 28, 2010

(86) PCT No.: PCT/JP2010/066762
§ 371 (c)(1),
(2), (4) Date: May 14, 2012

(87) PCT Pub. No.: WO2011/040383
PCT Pub. Date: Apr. 7, 2011

(65) Prior Publication Data
US 2012/0217435 A1   Aug. 30, 2012

(30) Foreign Application Priority Data

Sep. 30, 2009   (JP) ................. 2009-227868

(51) Int. Cl.
| | |
|---|---|
| *H01M 4/485* | (2010.01) |
| *H01M 4/50* | (2010.01) |
| *H01M 4/525* | (2010.01) |
| *C01G 51/00* | (2006.01) |
| *B82Y 30/00* | (2011.01) |
| *C01G 45/12* | (2006.01) |
| *C01G 53/00* | (2006.01) |
| *H01M 4/505* | (2010.01) |

(52) U.S. Cl.
CPC ............... *C01G 51/50* (2013.01); *B82Y 30/00* (2013.01); *C01G 45/1228* (2013.01); *C01G 51/42* (2013.01); *C01G 53/42* (2013.01); *C01G 53/50* (2013.01); *H01M 4/505* (2013.01); *H01M 4/525* (2013.01); *C01P 2002/52* (2013.01); *C01P 2002/72* (2013.01); *C01P 2002/74* (2013.01); *C01P 2002/76* (2013.01); *C01P 2004/61* (2013.01); *C01P 2004/62* (2013.01); *C01P 2004/64* (2013.01); *C01P 2006/12* (2013.01); *C01P 2006/40* (2013.01); *C01P 2006/80* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 5,503,930 | A | 4/1996 | Maruyama et al. |
| 6,680,143 | B2 | 1/2004 | Thackeray et al. |
| 7,429,435 | B2 | 9/2008 | Nakane et al. |
| 2004/0081888 | A1 | 4/2004 | Thakeray et al. |
| 2004/0234857 | A1 | 11/2004 | Shiozaki |
| 2007/0160906 | A1 | 7/2007 | Tooyama et al. |
| 2008/0070122 | A1 | 3/2008 | Park et al. |
| 2009/0280412 | A1* | 11/2009 | Imanari et al. ............. 429/221 |
| 2011/0003200 | A1 | 1/2011 | Shizuka et al. |

FOREIGN PATENT DOCUMENTS

| | | |
|---|---|---|
| JP | 4-328258 | 11/1992 |
| JP | 8-55624 | 2/1996 |
| JP | 8-171935 | 7/1996 |
| JP | 8-315856 | 11/1996 |
| JP | 2000-113884 | 4/2000 |
| JP | 2002-124258 | 4/2002 |
| JP | 2002-304993 | 10/2002 |
| JP | 2004-152753 | 5/2004 |
| JP | 2007-184145 | 7/2007 |
| JP | 2008-78139 | 4/2008 |
| JP | 2008-098154 | 4/2008 |
| JP | 2009-158415 | 7/2009 |
| WO | WO 03/044881 | 5/2003 |

OTHER PUBLICATIONS

International Search Report for PCT/JP2010/066762, mailed Dec. 28, 2010.

* cited by examiner

*Primary Examiner* — Tanisha Diggs
(74) *Attorney, Agent, or Firm* — Nixon & Vanderhye P.C.

(57) ABSTRACT

Positive electrode active substance particles including a compound having at least a crystal system belonging to a space group of R−3m and a crystal system belonging to a space group of C2/m, and boron. The compound is a composite oxide comprising at least Li, Mn, and Co and/or Ni; a relative intensity ratio [(a)/(b)] of a maximum diffraction peak intensity (a) observed at $2\theta=20.8\pm1°$ in a powder X-ray diffraction pattern of the positive electrode active substance as measured using a Cu-Kα ray to a maximum diffraction peak intensity (b) observed at $2\theta=18.6\pm1°$ in the powder X-ray diffraction pattern, is 0.02 to 0.5; a content of Mn in the positive electrode active substance particles such that a molar ratio of Mn/(Ni+Co+Mn) is not less than 0.55; and the positive electrode active substance particles include boron in an amount of 0.001 to 3% by weight.

6 Claims, 1 Drawing Sheet

POSITIVE ELECTRODE ACTIVE SUBSTANCE PARTICLES AND PROCESS FOR PRODUCING THE SAME, AND NON-AQUEOUS ELECTROLYTE SECONDARY BATTERY

This application is the U.S. national phase of International Application No. PCT/JP2010/066762, filed 28 Sep. 2010, which designated the U.S. and claims priority to Japan Application No. 2009-227868, filed 30 Sep. 2009, the entire contents of each of which are hereby incorporated by reference.

TECHNICAL FIELD

The present invention relates to positive electrode (cathode) active substance particles for non-aqueous electrolyte secondary batteries which exhibit a large charge/discharge capacity and are excellent in cycle characteristics.

BACKGROUND ART

With the recent rapid development of portable and cordless electronic devices such as audio-visual (AV) devices and personal computers, there is an increasing demand for secondary batteries having a small size, a light weight and a high energy density as a power source for driving these electronic devices. Also, in consideration of global environments, electric cars and hybrid cars have been recently developed and put into practice, so that there is an increasing demand for lithium ion secondary batteries used in large size applications which have excellent storage characteristics. Under these circumstances, the lithium ion secondary batteries having advantages such as a large charge/discharge capacity have been noticed.

Hitherto, as positive electrode active substances useful for high energy-type lithium ion secondary batteries exhibiting a 4 V-grade voltage, there are generally known $LiMn_2O_4$ having a spinel structure, $LiMnO_2$ having a zigzag layer structure, $LiCoO_2$ and $LiNiO_2$ having a layer rock-salt structure, or the like. Among the secondary batteries using these active substances, lithium ion secondary batteries using $LiNiO_2$ have been noticed because of a large charge/discharge capacity thereof. However, these materials tend to be deteriorated in thermal stability upon charging and charge/discharge cycle durability, and, therefore, it has been required to further improve properties thereof.

Specifically, when lithium is released from $LiNiO_2$, the crystal structure of $LiNiO_2$ suffers from Jahn-Teller distortion since $Ni^{3+}$ is converted into $Ni^{4+}$. When the amount of Li released reaches 0.45, the crystal structure of such a lithium-released region of $LiNiO_2$ is transformed from a hexagonal system into a monoclinic system, and a further release of lithium therefrom causes transformation of the crystal structure from a monoclinic system into a hexagonal system. Therefore, when the charge/discharge reaction is repeated, the crystal structure of $LiNiO_2$ tends to become unstable, so that the resulting secondary batteries tend to be deteriorated in cycle characteristics or suffer from occurrence of undesired reaction between $LiNiO_2$ and an electrolyte solution owing to release of oxygen therefrom, resulting in deterioration in thermal stability and storage characteristics of the secondary batteries. To solve these problems, various studies have been made on materials to which Co and Al to are added by substituting a part of Ni in $LiNiO_2$ therewith. However, these materials have still failed to solve the above-described conventional problems. Therefore, it has still been required to provide an Li—Ni-based composite oxide having a higher crystallinity.

Hitherto, in order to improve various properties of $LiNiO_2$ particles such as stability of a crystal structure and charge/discharge cycle characteristics, various methods have been attempted. For example, there are known the technique in which the surface of $LiNiAlO_2$ is coated with an Li—Ni—Co—Mn composite oxide to improve cycle characteristics thereof (Patent Document 1); the technique in which different kinds of materials, i.e., an Li—Co composite oxide and an Li—Ni—Co—Mn composite oxide are mixed with each other to improve charge/discharge cycle characteristics of the Li—Co composite oxide (Patent Document 2); the technique in which lithium carbonate, $Ni(OH)_2$, $Co(OH)_2$ and manganese carbonate are suspended in an Li—Co composite oxide, or the Li—Co composite oxide is mechanically treated and coated with an Li—Ni—Co—Mn composite oxide, to improve charge/discharge cycle characteristics of the Li—Co composite oxide (Patent Document 3 and Patent Document 4); and the like.

However, the materials obtained in the above conventional techniques have still failed to satisfactorily meet the requirement for reduction in size of batteries owing to a low charge/discharge capacity thereof. In recent years, it has been found that the substance comprising $Li_2MnO_3$ belonging to a space group of C2/m having a higher capacity exhibits a high charge/discharge capacity. However, the substance must be charged at a high potential, and therefore it is known that a secondary battery produced therefrom tends to have fatal disadvantages, i.e., tends to be deteriorated in cycle characteristics (Patent Document 5). There has been reported the technique using the substance which is improved in cycle characteristics. However, the technique tends to be still insufficient in cycle characteristics (Patent Document 6).

PRIOR ART DOCUMENTS

Patent Documents

Patent Document 1: Japanese Patent Application Laid-open (KOKAI) No. 2004-127694
Patent Document 2: Japanese Patent Application Laid-open (KOKAI) No. 2005-317499
Patent Document 3: Japanese Patent Application Laid-open (KOKAI) No. 2006-331943
Patent Document 4: Japanese Patent Application Laid-open (KOKAI) No. 2007-48711
Patent Document 5: Japanese Patent Application Laid-open (KOKAI) No. 9-55211
Patent Document 6: Japanese Patent Application Laid-open (KOKAI) No. 2008-270201

SUMMARY OF THE INVENTION

Problem to be Solved by the Invention

At present, it has been strongly required to provide a positive electrode active substance for non-aqueous electrolyte secondary batteries which is excellent in charge/discharge capacity and cycle characteristics. However, the positive electrode active substance capable of fully satisfying the above requirements has not been obtained until now.

In consequence, an object of the present invention is to provide positive electrode active substance particles for non-aqueous electrolyte secondary batteries which have a large charge/discharge capacity and excellent cycle characteristics, a process for producing the positive electrode active substance particles, and a non-aqueous electrolyte secondary battery comprising a positive electrode comprising the positive electrode active substance particles.

Means for Solving the Problem

That is, according to the present invention, there are provided positive electrode active substance particles comprising a compound having at least a crystal system belonging to a space group of R–3m and a crystal system belonging to a space group of C2/m, and boron, which compound is a composite oxide comprising at least Li, Mn, and Co and/or Ni;

which positive electrode active substance particles whose relative intensity ratio [(a)/(b)] of a maximum diffraction peak intensity (a) observed at $2\theta=20.8\pm1°$ in a powder X-ray diffraction pattern of the positive electrode active substance as measured using a Cu-Kα ray to a maximum diffraction peak intensity (b) observed at $2\theta=18.6\pm1°$ in the powder X-ray diffraction pattern, is 0.02 to 0.5;

a content of Mn in the positive electrode active substance particles being controlled such that a molar ratio of Mn/(Ni+Co+Mn) therein is not less than 0.55; and which positive electrode active substance particles comprise the boron in an amount of 0.001 to 3% by weight (Invention 1).

Also, according to the present invention, there are provided the positive electrode active substance particles as described in the above Invention 1, wherein the positive electrode active substance particles comprise $LiM_xMn_{1-x}O_2$ wherein M is Ni and/or Co; $0<x\leq1$, as a compound having a crystal system belonging to a space group of R–3m, and $Li_2M'_{(1-y)}Mn_yO_3$ wherein M' is Ni and/or Co; $0<y\leq1$, as a compound having a crystal system belonging to a space group of C2/m (Invention 2).

Also, according to the present invention, there are provided the positive electrode active substance particles as described in the above Invention 1 or 2, wherein the positive electrode active substance particles have a molar ratio of Li/(Ni+Co+Mn) of 1.2 to 1.7 (Invention 3).

Also, according to the present invention, there are provided the positive electrode active substance particles as described in any one of the above Inventions 1 to 3, wherein the positive electrode active substance particles have a specific surface area of 0.05 to 20 m²/g as measured by a BET method (Invention 4).

Also, according to the present invention, there are provided the positive electrode active substance particles as described in any one of the above Inventions 1 to 4, wherein the positive electrode active substance particles are in the form of secondary particles produced by aggregating primary particles thereof in which the primary particles have an average primary particle diameter is not more than 3 μm, and the secondary particles have an average secondary particle diameter is 1 to 50 μm (Invention 5).

In addition, according to the present invention, there is provided a process for producing the positive electrode active substance particles as described in any one of the above Inventions 1 to 5, comprising the step of calcining a mixture comprising precursor particles comprising Mn, and Ni and/or Co, a lithium compound and a boron compound at a temperature of 500 to 1500° C., wherein a content of Mn in the precursor particles comprising Mn, and Ni and/or Co is controlled such that a molar ratio of Mn/(Ni+Co+Mn) therein is not less than 0.55 (Invention 6).

Further, according to the present invention, there is provided is a non-aqueous electrolyte secondary battery comprising a positive electrode comprising the positive electrode active substance particles as described in any one of the above Inventions 1 to 5 (Invention 7).

Effect of the Invention

The positive electrode active substance particles according to the present invention can exhibit a large charge/discharge capacity and can be improved in cycle characteristics, and therefore can be suitably used as positive electrode active substance particles for non-aqueous secondary batteries.

PREFERRED EMBODIMENT FOR CARRYING OUT THE INVENTION

Figure 1:
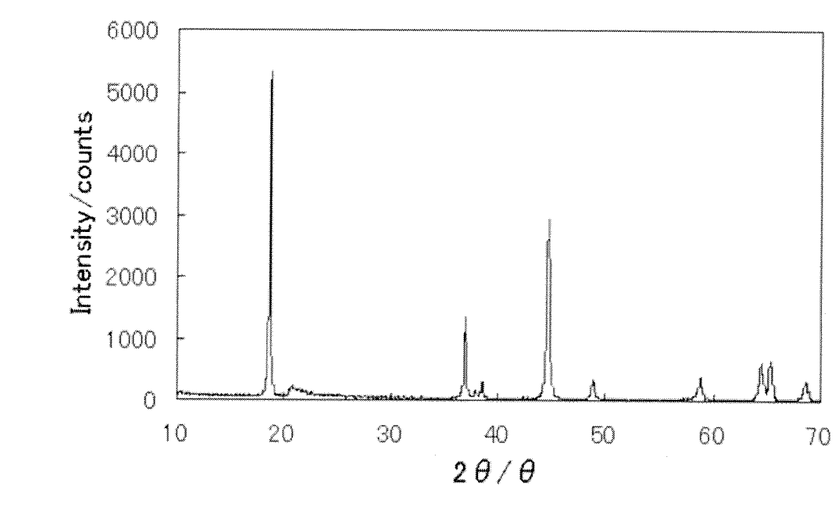
FIG. 1 is an X-ray diffraction pattern of positive electrode active substance particles obtained in Example 2.

The construction of the present invention is described in more detail below.

The positive electrode active substance particles according to the present invention comprise a compound having at least a crystal system belonging to a space group of R–3m and a crystal system belonging to a space group of C2/m, and are in the form of a compound which comprises a composite oxide comprising at least Li, Mn, and Co and/or Ni, and boron.

The compound having a crystal system belonging to a space group of R–3m preferably includes those compounds represented by the formula: $LiM_xMn_{1-x}O_2$ wherein M is Ni and/or Co; $0<x\leq1$. Specific examples of the preferred $LiM_xMn_{1-x}O_2$ include $LiCo_xMn_{1-x}O_2$, $LiNi_xMn_{1-x}O_2$, and $Li(Ni,Co)_xMn_{1-x}O_2$.

Meanwhile, the numerical character "3" of the above space group of "R–3m" is actually indicated with a "macron" as "$\bar{3}$", but the symbol of the space group is conveniently expressed herein by "R–3m".

The compound having a crystal system belonging to a space group of C2/m preferably includes those compounds represented by the formula: $Li_2M'_{(1-y)}Mn_yO_3$ wherein M' is Ni and/or Co; $0<y\leq1$.

When the positive electrode active substance particles are subjected to a powder X-ray diffraction analysis using a Cu-Kα ray as a radiation source, one peak inherent to $LiM_xMn_{1-x}O_2$ as the compound having a crystal system belonging to a space group of R–3m is observed at $2\theta=18.6\pm1°$ in the powder diffraction pattern, whereas another peak inherent to $Li_2M'_{(1-y)}Mn_yO_3$ as the compound having a crystal system belonging to a space group of C2/m is observed at $2\theta=20.8\pm1°$ in the powder diffraction pattern.

The relative intensity ratio [(a)/(b)] of a maximum diffraction peak intensity (a) observed at $2\theta=20.8\pm1°$ in the powder X-ray diffraction pattern to a maximum diffraction peak intensity (b) observed at $2\theta=18.6\pm1°$ in the powder X-ray diffraction pattern, is 0.02 to 0.5. When the relative intensity ratio [(a)/(b)] is less than 0.02, the resulting positive electrode active substance particles tend to hardly exhibit a sufficient charge/discharge capacity owing to an excessively small amount of the compound having a crystal system belonging to a space group of C2/m. When the relative intensity ratio [(a)/(b)] is more than 0.5, lithium ions in the resulting positive electrode active substance particles tend to be hardly moved smoothly owing to an excessively large amount of the compound having a crystal system belonging to a space group of C2/m, so that the positive electrode active substance particles tend to hardly exhibit a sufficient charge/discharge capacity. The relative intensity ratio [(a)/(b)] is preferably 0.02 to 0.4, more preferably 0.02 to 0.3 and still more preferably 0.025 to 0.2.

In the positive electrode active substance particles according to the present invention, the molar ratio of Li/(Ni+Co+Mn) therein is preferably 1.2 to 1.7. When the molar ratio of Li/(Ni+Co+Mn) is less than 1.2, the resulting positive electrode active substance particles tend to be deteriorated in charge capacity owing to a less amount of lithium therein contributing to charging. When the molar ratio of Li/(Ni+Co+Mn) is more than 1.7, the resulting positive electrode active substance particles tend to be contrarily deteriorated in discharge capacity owing to an excessively large amount of lithium therein. The molar ratio of Li/(Ni+Co+Mn) in the positive electrode active substance particles is more preferably 1.25 to 1.65 and still more preferably 1.3 to 1.6.

In the positive electrode active substance particles according to the present invention, the content of Mn therein is controlled such that a molar ratio of Mn/(Ni+Co+Mn) therein is not less than 0.55. When the molar ratio of Mn/(Ni+Co+Mn) is less than 0.55, the compound having a crystal system belonging to a space group of C2/m tends to be formed in a sufficient amount, so that the resulting positive electrode active substance particles tend to be deteriorated in charge/discharge capacity. The molar ratio of Mn/(Ni+Co+Mn) in the positive electrode active substance particles is preferably not less than 0.56, more preferably not less than 0.6 and still more preferably not less than 0.65. The upper limit of the molar ratio of Mn/(Ni+Co+Mn) is preferably about 0.95.

In the positive electrode active substance particles according to the present invention, the content of Ni therein is controlled such that a molar ratio of Ni/(Ni+Co+Mn) is preferably 0 to 0.45. When the molar ratio of Ni/(Ni+Co+Mn) is more than 0.45, the resulting positive electrode active substance particles tend to be deteriorated in thermal stability. The molar ratio of Ni/(Ni+Co+Mn) in the positive electrode active substance particles is more preferably 0 to 0.35.

In the positive electrode active substance particles according to the present invention, the content of Co therein is controlled such that a molar ratio of Co/(Ni+Co+Mn) therein is preferably 0 to 0.45. When the molar ratio of Co/(Ni+Co+Mn) is more than 0.45, the resulting positive electrode active substance particles tend to be deteriorated in stability of their structure. The molar ratio of Co/(Ni+Co+Mn) in the positive electrode active substance particles is more preferably 0 to 0.35.

The positive electrode active substance particles according to the present invention comprise boron in an amount of 0.001 to 3% by weight. When the content of boron in the positive electrode active substance particles is less than 0.001% by weight, the secondary battery produced using the resulting positive electrode active substance particles tends to be hardly improved in cycle characteristics. When the content of boron in the positive electrode active substance particles is more than 3% by weight, the resulting positive electrode active substance particles tend to be deteriorated in charge/discharge capacity. The content of boron in the positive electrode active substance particles is preferably 0.003 to 2% by weight, more preferably 0.005 to 1% by weight and still more preferably 0.02 to 0.5% by weight.

The specific surface area of the positive electrode active substance particles according to the present invention as measured by a BET method is preferably 0.05 to 20 $m^2/g$, more preferably 0.1 to 10 $m^2/g$ and still more preferably 0.1 to 4 $m^2/g$.

The positive electrode active substance particles according to the present invention are in the form of secondary particles produced by aggregating primary particles thereof. The average primary particle diameter of the positive electrode active substance particles is preferably not more than 3 μm, more preferably 0.01 to 1.5 μm and still more preferably 0.02 to 0.8 μm.

The average secondary particle diameter of the positive electrode active substance particles according to the present invention is preferably 1 to 50 μm. When the average secondary particle diameter of the positive electrode active substance particles is less than 1 μm, the resulting positive electrode active substance particles tend to exhibit an excessively high reactivity with an electrolyte solution owing to excessive increase in contact area with the electrolyte solution, and therefore tend to be deteriorated in stability upon charging. When the average secondary particle diameter of the positive electrode active substance particles is more than 50 μm, the resulting electrode tends to exhibit an increased internal resistance and therefore tends to be deteriorated in charge/discharge rate characteristic. The average secondary particle diameter of the positive electrode active substance particles is more preferably 2 to 34 μm and still more preferably 3 to 26 μm.

Next, the process for producing the positive electrode active substance particles according to the present invention is described.

The positive electrode active substance particles according to the present invention may be produced by mixing previously prepared transition metal-containing precursor particles with a boron compound and a lithium compound, and then calcining the resulting mixture at a temperature of 500 to 1500° C.

The above transition metal-containing precursor particles used in the present invention may be produced by supplying a mixed solution comprising a nickel salt, a cobalt salt and a manganese salt at desired concentrations and an alkali aqueous solution into a reaction vessel, controlling a pH value of the resulting suspension to 7.5 to 13, mainly circulating the overflowed suspension through a concentration vessel connected to an overflow pipe into the reaction vessel while controlling a concentration velocity of the suspension in the concentration vessel, and then conducting the reaction until a concentration of the precursor particles in the suspension in the reaction vessel and the precipitation vessel reaches 0.5 to 15 mol/L. After completion of the reaction, the resulting product may be subjected to water-washing, drying and pulverization by ordinary methods.

The transition metal-containing precursor particles used in the present invention are not particularly limited, and various transition metal compounds may be used in the present invention. Examples of the transition metal-containing precursor particles include particles of oxides, hydroxides, carbonates of transition metals as well as mixtures thereof. Among these precursor particles, preferred are particles of transition metal hydroxides.

The precursor particles used in the present invention preferably have an average particle diameter of 1 to 50 μm and a BET specific surface area of 3 to 120 $m^2/g$.

The boron compound used in the present invention is not particularly limited, and various boron compounds may be used in the present invention. Examples of the boron compound include diboron trioxide, boric acid (orthoboric acid), metaboric acid, tetraboric acid, and various borates such as lithium borate. Among these boron compounds, preferred is boric acid. The boron compound may be used in an amount of 0.02 to 20% by weight based on the weight of the above precursor particles.

The lithium compound used in the present invention is not particularly limited, and various lithium compounds may be used in the present invention. Examples of the lithium compound include lithium hydroxide monohydrate, lithium nitrate, lithium carbonate, lithium acetate, lithium bromide, lithium chloride, lithium citrate, lithium fluoride, lithium iodide, lithium lactate, lithium oxalate, lithium phosphate, lithium pyruvate, lithium sulfate and lithium oxide. Among these lithium compounds, preferred is lithium carbonate. The amount of the lithium compound compounded in the precursor particles may be 20 to 120% by weight based on the weight of the precursor particles.

In addition, the lithium compound used in the present invention preferably has an average particle diameter of not more than 50 μm and more preferably not more than 30 μm. When the average particle diameter of the lithium compound is more than 50 μm, the lithium compound tends to be hardly uniformly mixed with the precursor particles, so that it may be difficult to obtain composite oxide particles having a good crystallinity.

The mixing treatment of the transition metal-containing precursor particles with the boron compound and the lithium compound may be conducted by either a dry method or a wet method as long as the they may be uniformly mixed with each other.

The calcination temperature is preferably 500 to 1500° C. When the calcination temperature is less than 500° C., the reaction of Li with Ni, Co and Mn may fail to proceed sufficiently, so that these elements tend to be hardly formed into a composite material thereof. When the calcination temperature is more than 1500° C., sintering tends to excessively proceed. The calcination temperature is more preferably 700 to 1200° C. and still more preferably 800 to 1050° C. The atmosphere upon the calcination is preferably an oxidative gas atmosphere, and more preferably ordinary atmospheric air. The calcination time is preferably 3 to 30 hr.

In the present invention, it is essentially required that the resulting positive electrode active substance particles comprise a compound at least having a crystal system belonging to a space group of R–3m and a crystal system belonging to a space group of C2/m at specific proportions. In order to allow the compound obtained by the calcination to comprise the above two kinds of crystal systems in specific proportions, it may be basically required to prepare the precursor particles whose Mn content is controlled such that the molar ratio of Mn/(Ni+Co+Mn) therein is not less than 0.55 and preferably 0.55 to 0.95. As the method of controlling the molar ratio of Mn/(Ni+Co+Mn) in the precursor particles to the above range, there may be used the method of controlling amounts of the nickel salt, cobalt salt and manganese salt as the raw materials, the method of controlling a pH value of the reaction solution, the method of controlling an amount of a complexing agent such as ammonia, or the like. Meanwhile, the crystal system belonging to a space group of R–3m is derived from the above compound of $LiM_xMn_{1-x}O_2$ whereas the crystal system belonging to a space group of C2/m is derived from the above compound $Li_2M'_{(1-y)}Mn_yO_3$. These compounds are produced at the same time through a series of the production steps, and the proportions therebetween may be basically determined according to the Mn content in the precursor particles as described above.

In the method of controlling a pH value of the reaction solution, when the pH value of the reaction solution is lowered, there is a tendency that the peak intensity ratio [(a)/(b)] is decreased, i.e., the amount of $Li_2M'_{(1-y)}Mn_yO_3$ having a crystal system belonging to a space group of C2/m is reduced. On the contrary, when the pH value of the reaction solution is raised, there is a tendency that the peak intensity ratio [(a)/(b)] is increased, i.e., the amount of $Li_2M'_{(1-y)}Mn_yO_3$ having a crystal system belonging to a space group of C2/m is increased.

In the method of controlling an amount of the complexing agent added to the reaction solution, when the amount of the complexing agent added to the reaction solution is reduced, there is a tendency that the peak intensity ratio [(a)/(b)] is decreased, i.e., the amount of $Li_2M'_{(1-y)}Mn_yO_3$ having a crystal system belonging to a space group of C2/m is reduced. On the contrary, when the amount of the complexing agent added to the reaction solution is increased, there is a tendency that the peak intensity ratio [(a)/(b)] is increased, i.e., the amount of $Li_2M'_{(1-y)}Mn_yO_3$ having a crystal system belonging to a space group of C2/m is increased.

As the complexing agent, there may be used one or more compounds selected from the group consisting of ammonium ion supplying substances, hydrazine, ethylenediaminetetraacetic acid, nitrilotriacetic acid, uracil diacetic acid, dimethylglyoxime, dithizone, oxine, acetyl acetone and glycine.

Further, the peak intensity ratio [(a)/(b)] may vary by controlling the calcination conditions. That is, when the calcination temperature is raised, there is a tendency that the peak intensity ratio [(a)/(b)] is lowered, i.e., the amount of $Li_2M'_{(1-y)}Mn_yO_3$ having a crystal system belonging to a space group of C2/m is reduced. On the contrary, when the calcination temperature is dropped, there is a tendency that the peak intensity ratio [(a)/(b)] is increased, i.e., the amount of $Li_2M'_{(1-y)}Mn_yO_3$ having a crystal system belonging to a space group of C2/m is increased.

Next, the positive electrode comprising the positive electrode active substance particles according to the present invention is described.

When producing the positive electrode comprising the positive electrode active substance particles according to the present invention, a conducting agent and a binder are added to and mixed with the positive electrode active substance particles by an ordinary method. Examples of the preferred conducting agent include acetylene black, carbon black and graphite. Examples of the preferred binder include polytetrafluoroethylene and polyvinylidene fluoride.

The secondary battery produced by using the positive electrode active substance particles according to the present invention comprises the above positive electrode, a negative electrode and an electrolyte.

Examples of a negative electrode active substance which may be used for production of the negative electrode include metallic lithium, lithium/aluminum alloys, lithium/tin alloys, and graphite or black lead.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving lithium phosphate hexafluoride as well as at least one lithium salt selected from the group consisting of lithium perchlorate and lithium borate tetrafluoride in the above solvent.

The secondary battery produced by using the positive electrode comprising the positive electrode active substance particles according to the present invention has an initial discharge capacity of not less than 200 mAh/g as measured by the below-mentioned evaluation method. The initial discharge capacity of the secondary battery is preferably as high as possible.

<Function>

It is considered by the present inventors that in the present invention, since the boron component is present on the surface of the respective positive electrode active substance particles, the interaction between Li—Mn-boron compounds present on the surface of the respective particles serves for suppressing excessive contact between the electrolyte solution and the positive electrode material, so that the resulting secondary battery can be enhanced in cycle characteristics.

EXAMPLES

Next, the present invention are described in more detail by the following Examples. The following Examples are only illustrative and are not intended to limit the present invention thereto. The evaluation methods used in the following Examples and Comparative Examples are as follows.

The BET specific surface area was measured by a BET method using nitrogen.

The contents of elements constituting the positive electrode active substance particles such as lithium, nickel, cobalt, manganese and boron were determined as follow. That is, the positive electrode active substance particles were dissolved in an acid, and the resulting solution was analyzed by a plasma emission spectroscopic device "ICPS-7500" (manufactured by Shimadzu Seisakusho Co., Ltd.).

The identification of phase and the measurement of intensity were carried out by X-ray diffraction analysis. The X-ray diffraction analysis was conducted using an X-ray diffractometer "RINT-2000" manufactured by Rigaku Co., Ltd., (tube: Cu; tube voltage: 40 kV; tube current: 40 mA; step angle: 0.020°; count time: 0.6 s; divergence slit: 1°; scattering slit: 1°; light-receiving slit: 0.30 mm).

The average primary particle diameter and average secondary particle diameter of the particles were observed and determined using a scanning electron microscope "SEM-EDX" equipped with an energy disperse type X-ray analyzer (manufactured by Hitachi High-Technologies Corp.).

The coin cell produced by using the positive electrode active substance particles was evaluated for charge/discharge characteristics and cycle characteristics.

First, 84% by weight of the composite oxide as a positive electrode active substance, 4% by weight of acetylene black and 4% by weight of a graphite "KS-6" both serving as a conducting material, and 8% by weight of polyvinylidene fluoride dissolved in N-methyl pyrrolidone as a binder, were mixed with each other, and the resulting mixture was applied onto an Al metal foil and then dried at 150° C. The thus obtained sheets were blanked into 16 mmϕ and then compression-bonded to each other under a pressure of 1 t/cm², thereby producing an electrode having a thickness of 50 μm and using the thus produced electrode as a positive electrode. A metallic lithium blanked into 16 mmϕ was used as a negative electrode, and a solution prepared by mixing EC and DMC with each other at a volume ratio of 1:2 in which 1 mol/L of $LiPF_6$ was dissolved, was used as an electrolyte solution, thereby producing a coin cell of a CR2032 type.

The initial charge/discharge cycle of the coin cell was conducted as follows. That is, at a temperature of 25° C., the coin cell was charged at a current density of 20 mA/g until reaching 4.6 V and then charged at a constant voltage until the current value reached 1/100, and discharged at a current density of 20 mA/g until reaching 2.0 V. The second and subsequent charge/discharge cycles were conducted in the same manner as defined in the above initial charge/discharge cycle except that the current density was changed to 40 mA/g.

Example 1

A sealed type reaction vessel was charged with 14 L of water, and an inside of the reaction vessel was maintained at 50° C. while flowing a nitrogen gas therethrough. Further, a 1.5 M Ni-, Co- and Mn-sulfate mixed aqueous solution, a 0.8 M sodium carbonate aqueous solution and a 2 M ammonia aqueous solution were successively added into the reaction vessel while stirring such that the pH value therein was adjusted to 8.2 (±0.2). During the reaction, a filtrate only was discharged out of the reaction system using a concentration device, whereas a solid component separated from the filtrate was retained in the reaction vessel. After the reaction was continued for 20 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 800° C. for 5 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R−3m and a crystal system belonging to a space group of C2/m, and had a peak intensity ratio [(a)/(b)] of 0.11.

In addition, as a result of subjecting the resulting positive electrode active substance particles to ICP composition analysis, it was confirmed that the molar ratio of Li/(Ni+Co+Mn) was 1.33; the molar ratio of Ni:Co:Mn was 21.6:12.4:66 (i.e., the molar ratio of Mn/(Ni+Co+Mn) was 0.66); the boron (B) content was 0.05% by weight; and the BET specific surface area as measured by a nitrogen absorption method was 3.5 m²/g. Further, as a result of observing the positive electrode active substance particles using a scanning electron microscope (SEM), it was recognized that primary particles thereof having an average primary particle diameter of 0.07 μm were aggregated together to form secondary particles having an average secondary particle diameter of 12.1 μm.

Example 2

A sealed type reaction vessel was charged with 14 L of water, and an inside of the reaction vessel was maintained at 45° C. while flowing a nitrogen gas therethrough. Further, a 1.5 M Ni-, Co- and Mn-sulfate mixed aqueous solution, a 0.8 M sodium carbonate aqueous solution and a 2 M ammonia aqueous solution were successively added into the reaction vessel while stirring such that the pH value therein was adjusted to 8.6 (±0.2). During the reaction, a filtrate only was discharged out of the reaction system using a concentration device, whereas a solid component separated from the filtrate was retained in the reaction vessel. After the reaction was continued for 60 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 850° C. for 5 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R–3m and a crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Example 3

A sealed type reaction vessel was charged with 14 L of water, and an inside of the reaction vessel was maintained at 55° C. while flowing a nitrogen gas therethrough. Further, a 1.5 M Ni-, Co- and Mn-sulfate mixed aqueous solution, a 0.8 M sodium carbonate aqueous solution and a 2 M ammonia aqueous solution were successively added into the reaction vessel while stirring such that the pH value therein was adjusted to 8.0 (±0.2). During the reaction, a filtrate only was discharged out of the reaction system using a concentration device, whereas a solid component separated from the filtrate was retained in the reaction vessel. After the reaction was continued for 20 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 1000° C. for 11 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R–3m and a crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Example 4

A sealed type reaction vessel was charged with 14 L of water, and an inside of the reaction vessel was maintained at 55° C. while flowing a nitrogen gas therethrough. Further, a 1.5 M Ni-, Co- and Mn-sulfate mixed aqueous solution, a 0.8 M sodium carbonate aqueous solution and a 2 M ammonia aqueous solution were successively added into the reaction vessel while stirring such that the pH value therein was adjusted to 9.0 (±0.2). During the reaction, a filtrate only was discharged out of the reaction system using a concentration device, whereas a solid component separated from the filtrate was retained in the reaction vessel. After the reaction was continued for 70 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 780° C. for 6 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R–3m and a crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Example 5

A sealed type reaction vessel was charged with 14 L of water, and an inside of the reaction vessel was maintained at 55° C. while flowing a nitrogen gas therethrough. Further, a 1.5 M Ni-, Co- and Mn-sulfate mixed aqueous solution and a 0.8 M sodium carbonate aqueous solution were successively added into the reaction vessel while stirring such that the pH value therein was adjusted to 8.0 (±0.2). During the reaction, a filtrate only was discharged out of the reaction system using a concentration device, whereas a solid component separated from the filtrate was retained in the reaction vessel. After the reaction was continued for 50 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 1120° C. for 8 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R–3m and a crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Example 6

A sealed type reaction vessel was charged with 14 L of water, and an inside of the reaction vessel was maintained at 55° C. while flowing a nitrogen gas therethrough. Further, a 1.5 M Ni-, Co- and Mn-sulfate mixed aqueous solution and a 0.8 M sodium carbonate aqueous solution were successively added into the reaction vessel while stirring such that the pH value therein was adjusted to 9.1 (±0.2). During the reaction, a filtrate only was discharged out of the reaction system using a concentration device, whereas a solid component separated from the filtrate was retained in the reaction vessel. After the reaction was continued for 110 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium hydroxide monohydrate particles and diboron trioxide were weighed and intimately mixed with each other. The resulting mixture was calcined at 670° C. for 12 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R–3m and a crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Example 7

A sealed type reaction vessel was charged with 14 L of water, and an inside of the reaction vessel was maintained at 40° C. while flowing a nitrogen gas therethrough. Further, a 1.5 M Ni-, Co- and Mn-sulfate mixed aqueous solution and a 0.8 M sodium carbonate aqueous solution were successively added into the reaction vessel while stirring such that the pH value therein was adjusted to 8.6 (±0.2). During the reaction, a filtrate only was discharged out of the reaction system using a concentration device, whereas a solid component separated from the filtrate was retained in the reaction vessel. After the reaction was continued for 140 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium hydroxide monohydrate particles and diboron trioxide were weighed and intimately mixed with each other. The resulting mixture was calcined at 1310° C. for 2 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R–3m and a crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Example 8

A sealed type reaction vessel was charged with 14 L of water, and an inside of the reaction vessel was maintained at 55° C. while flowing a nitrogen gas therethrough. Further, a 1.5 M Ni-, Co- and Mn-hydrochloride mixed aqueous solution, a 4 M sodium hydroxide aqueous solution and a 4 M ammonia aqueous solution were successively added into the reaction vessel while stirring such that the pH value therein was adjusted to 10.1 (±0.5). During the reaction, a filtrate only was discharged out of the reaction system using a concentration device, whereas a solid component separated from the filtrate was retained in the reaction vessel. After the reaction was continued for 70 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 900° C. for 6 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R–3m and a crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Example 9

A sealed type reaction vessel was charged with 14 L of water, and an inside of the reaction vessel was maintained at 55° C. while flowing a nitrogen gas therethrough. Further, a 1.5 M Ni-, Co- and Mn-hydrochloride mixed aqueous solution, a 0.8 M sodium carbonate aqueous solution and a 2 M ammonia aqueous solution were successively added into the reaction vessel while stirring such that the pH value therein was adjusted to 8.1 (±0.5). During the reaction, a filtrate only was discharged out of the reaction system using a concentration device, whereas a solid component separated from the filtrate was retained in the reaction vessel. After the reaction was continued for 240 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 900° C. for 6 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R–3m and a crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Example 10

A sealed type reaction vessel was charged with 14 L of water, and an inside of the reaction vessel was maintained at 45° C. while flowing a nitrogen gas therethrough. Further, a 1.5 M Ni- and Mn-nitrate mixed aqueous solution, a 0.8 M sodium carbonate aqueous solution and a 2 M ammonia aqueous solution were successively added into the reaction vessel while stirring such that the pH value therein was adjusted to 8.3 (±0.3). During the reaction, a filtrate only was discharged out of the reaction system using a concentration device, whereas a solid component separated from the filtrate was retained in the reaction vessel. After the reaction was continued for 980 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium nitrate particles and boric acid were weighed and intimately mixed with each other. The resulting mixture was calcined at 900° C. for 6 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R–3m and a crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Example 11

A sealed type reaction vessel was charged with 14 L of water, and an inside of the reaction vessel was maintained at 45° C. while flowing a nitrogen gas therethrough. Further, a 1.5 M Ni-, Co- and Mn-nitrate mixed aqueous solution, a 0.8 M sodium carbonate aqueous solution and a 2 M ammonia aqueous solution were successively added into the reaction vessel while stirring such that the pH value therein was adjusted to 8.3 (±0.3). During the reaction, a filtrate only was discharged out of the reaction system using a concentration device, whereas a solid component separated from the filtrate was retained in the reaction vessel. After the reaction was continued for 50 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium nitrate particles and boric acid were weighed and intimately mixed with each other. The resulting mixture was calcined at 950° C. for 7 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R–3m and a crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Example 12

A sealed type reaction vessel was charged with 14 L of water, and an inside of the reaction vessel was maintained at 45° C. while flowing a nitrogen gas therethrough. Further, a 1.5 M Co- and Mn-nitrate mixed aqueous solution, a 0.8 M sodium carbonate aqueous solution and a 2 M ammonia aqueous solution were successively added into the reaction vessel while stirring such that the pH value therein was adjusted to 8.3 (±0.3). During the reaction, a filtrate only was discharged out of the reaction system using a concentration device, whereas a solid component separated from the filtrate was retained in the reaction vessel. After the reaction was continued for 40 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium nitrate particles and boric acid were weighed and intimately mixed with each other. The resulting mixture was calcined at 950° C. for 5 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R–3m and a crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Example 13

A sealed type reaction vessel was charged with 14 L of water, and an inside of the reaction vessel was maintained at 50° C. while flowing a nitrogen gas therethrough. Further, a 1.5 M Ni- and Mn-sulfate mixed aqueous solution, a 0.8 M sodium carbonate aqueous solution and a 2 M ammonia aqueous solution were successively added into the reaction vessel while stirring such that the pH value therein was adjusted to 8.4 (±0.2). During the reaction, a filtrate only was discharged out of the reaction system using a concentration device, whereas a solid component separated from the filtrate was retained in the reaction vessel. After the reaction was continued for 90 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 900° C. for 6 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R–3m and a crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Comparative Example 1

A sealed type reaction vessel was charged with 14 L of water, and an inside of the reaction vessel was maintained at 50° C. while flowing a nitrogen gas therethrough. Further, a 1.5 M Ni-, Co- and Mn-sulfate mixed aqueous solution, a 0.8 M sodium carbonate aqueous solution and a 2 M ammonia aqueous solution were successively added into the reaction vessel while stirring such that the pH value therein was adjusted to 8.2 (±0.2). During the reaction, a filtrate only was discharged out of the reaction system using a concentration device, whereas a solid component separated from the filtrate was retained in the reaction vessel. After the reaction was continued for 110 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 850° C. for 5 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R–3m and a crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Comparative Example 2

A sealed type reaction vessel was charged with 14 L of water, and an inside of the reaction vessel was maintained at 50° C. while flowing a nitrogen gas therethrough. Further, a 1.5 M Ni-, Co- and Mn-sulfate mixed aqueous solution, a 0.8 M sodium carbonate aqueous solution and a 2 M ammonia aqueous solution were successively added into the reaction vessel while stirring such that the pH value therein was adjusted to 8.2 (±0.2). During the reaction, a filtrate only was discharged out of the reaction system using a concentration device, whereas a solid component separated from the filtrate was retained in the reaction vessel. After the reaction was continued for 30 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium hydroxide monohydrate particles were weighed and intimately mixed with each other. The resulting mixture was calcined at 850° C. for 5 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R–3m and a crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Comparative Example 3

A sealed type reaction vessel was charged with 14 L of water, and an inside of the reaction vessel was maintained at 50° C. while flowing a nitrogen gas therethrough. Further, a 1.5 M Ni-, Co- and Mn-sulfate mixed aqueous solution, a 0.8 M sodium carbonate aqueous solution and a 2 M ammonia aqueous solution were successively added into the reaction vessel while stirring such that the pH value therein was adjusted to 8.8 (±0.2). During the reaction, a filtrate only was discharged out of the reaction system using a concentration device, whereas a solid component separated from the filtrate was retained in the reaction vessel. After the reaction was continued for 50 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor and lithium hydroxide monohydrate particles were weighed and intimately mixed with each other. The resulting mixture was calcined at 780° C. for 5 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R–3m and a crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Comparative Example 4

A sealed type reaction vessel was charged with 14 L of water, and an inside of the reaction vessel was maintained at 50° C. while flowing a nitrogen gas therethrough. Further, a 1.5 M Ni-, Co- and Mn-sulfate mixed aqueous solution, a 0.8 M sodium carbonate aqueous solution and a 2 M ammonia aqueous solution were successively added into the reaction vessel while stirring such that the pH value therein was adjusted to 8.2 (±0.2). During the reaction, a filtrate only was discharged out of the reaction system using a concentration device, whereas a solid component separated from the filtrate was retained in the reaction vessel. After the reaction was continued for 30 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 800° C. for 9 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R–3m and a crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Comparative Example 5

A sealed type reaction vessel was charged with 14 L of water, and an inside of the reaction vessel was maintained at 45° C. while flowing a nitrogen gas therethrough. Further, a 1.5 M Ni- and Co-sulfate mixed aqueous solution, a 4 M sodium hydroxide aqueous solution and a 4 M ammonia aqueous solution were successively added into the reaction vessel while stirring such that the pH value therein was adjusted to 11.3 (±0.2). During the reaction, a filtrate only was discharged out of the reaction system using a concentration device, whereas a solid component separated from the filtrate was retained in the reaction vessel. After the reaction was continued for 40 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 850° C. for 10 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised no crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Comparative Example 6

A sealed type reaction vessel was charged with 14 L of water, and an inside of the reaction vessel was maintained at 50° C. while flowing a nitrogen gas therethrough. Further, a 1.5 M Ni-, Co- and Mn-sulfate mixed aqueous solution, a 0.8 M sodium carbonate aqueous solution and a 2 M ammonia aqueous solution were successively added into the reaction vessel while stirring such that the pH value therein was adjusted to 8.4 (±0.2). During the reaction, a filtrate only was discharged out of the reaction system using a concentration device, whereas a solid component separated from the filtrate was retained in the reaction vessel. After the reaction was continued for 50 hr, a slurry comprising a co-precipitated product was obtained. The thus obtained slurry was filtered, and the resulting solid was washed with water and dried at 105° C. overnight, thereby obtaining a co-precipitated precursor in the form of particles.

The thus obtained co-precipitated precursor, lithium carbonate particles and boric acid were weighed and intimately mixed with each other. The resulting mixture was calcined at 900° C. for 6 hr under an air flow using an electric furnace, thereby obtaining positive electrode active substance particles.

As a result of subjecting the resulting positive electrode active substance particles to X-ray diffraction analysis, it was confirmed that the positive electrode active substance particles comprised a crystal system belonging to a space group of R–3m and a crystal system belonging to a space group of C2/m.

The peak intensity ratio, molar ratio of Li/(Ni+Co+Mn), molar ratio of Ni:Co:Mn, content of B (wt %), BET specific surface area as measured by a nitrogen absorption method, average primary particle diameter and average secondary particle diameter of the thus obtained positive electrode active substance particles are shown in Table 1.

Various properties of the positive electrode active substances obtained in Examples 1 to 13 and Comparative Examples 1 to 6 are shown in Table 1.

TABLE 1

| Examples and Comparative Examples | B (wt %) | Li/(Ni + Co + Mn) | Ni/(Ni + Co + Mn) |
|---|---|---|---|
| Example 1 | 0.050 | 1.33 | 0.216 |
| Example 2 | 0.090 | 1.40 | 0.216 |
| Example 3 | 0.320 | 1.58 | 0.213 |
| Example 4 | 0.008 | 1.27 | 0.216 |
| Example 5 | 0.940 | 1.63 | 0.211 |
| Example 6 | 0.003 | 1.23 | 0.217 |
| Example 7 | 1.600 | 1.69 | 0.202 |
| Example 8 | 0.100 | 1.42 | 0.207 |
| Example 9 | 0.100 | 1.46 | 0.067 |
| Example 10 | 0.100 | 1.23 | 0.439 |
| Example 11 | 0.110 | 1.36 | 0.111 |
| Example 12 | 0.130 | 1.39 | 0.000 |
| Example 13 | 0.210 | 1.41 | 0.244 |
| Comparative Example 1 | 3.500 | 1.43 | 0.215 |
| Comparative Example 2 | 0.000 | 1.34 | 0.215 |
| Comparative Example 3 | 0.000 | 1.00 | 0.330 |
| Comparative Example 4 | 0.110 | 1.34 | 0.331 |
| Comparative Example 5 | 0.100 | 1.22 | 0.498 |
| Comparative Example 6 | 0.110 | 1.26 | 0.225 |

TABLE 1-continued

| Examples and Comparative Examples | Co/(Ni + Co + Mn) | Mn/(Ni + Co + Mn) | Peak intensity ratio [(a)/(b)] |
|---|---|---|---|
| Example 1 | 0.124 | 0.660 | 0.110 |
| Example 2 | 0.125 | 0.660 | 0.045 |
| Example 3 | 0.123 | 0.664 | 0.030 |
| Example 4 | 0.123 | 0.662 | 0.240 |
| Example 5 | 0.121 | 0.667 | 0.022 |
| Example 6 | 0.122 | 0.661 | 0.380 |
| Example 7 | 0.114 | 0.683 | 0.021 |
| Example 8 | 0.132 | 0.661 | 0.049 |
| Example 9 | 0.301 | 0.632 | 0.023 |
| Example 10 | 0.000 | 0.561 | 0.021 |
| Example 11 | 0.120 | 0.769 | 0.068 |
| Example 12 | 0.327 | 0.673 | 0.055 |
| Example 13 | 0.000 | 0.756 | 0.080 |
| Comparative Example 1 | 0.110 | 0.675 | 0.050 |
| Comparative Example 2 | 0.123 | 0.662 | 0.047 |
| Comparative Example 3 | 0.329 | 0.341 | 0.012 |
| Comparative Example 4 | 0.328 | 0.340 | 0.015 |
| Comparative Example 5 | 0.502 | 0.000 | 0.000 |
| Comparative Example 6 | 0.262 | 0.513 | 0.020 |

| Examples and Comparative Examples | BET specific surface area (m²/g) | Primary particle diameter (μm) | Secondary particle diameter (μm) |
|---|---|---|---|
| Example 1 | 3.5 | 0.07 | 12.1 |
| Example 2 | 2.3 | 0.13 | 14.8 |
| Example 3 | 0.4 | 0.75 | 11.7 |
| Example 4 | 8.9 | 0.05 | 14.3 |
| Example 5 | 0.2 | 1.21 | 13.6 |
| Example 6 | 16.6 | 0.04 | 12.6 |
| Example 7 | 0.2 | 2.84 | 14.1 |
| Example 8 | 2.9 | 0.16 | 5.2 |
| Example 9 | 2.1 | 0.15 | 20.6 |
| Example 10 | 1.9 | 0.18 | 29.1 |
| Example 11 | 1.3 | 0.19 | 15.1 |
| Example 12 | 1.2 | 0.18 | 14.2 |
| Example 13 | 1.7 | 0.12 | 18.3 |
| Comparative Example 1 | 0.1 | 3.60 | 16.0 |
| Comparative Example 2 | 2.1 | 0.12 | 12.2 |
| Comparative Example 3 | 0.4 | 0.15 | 13.1 |
| Comparative Example 4 | 0.2 | 0.19 | 12.8 |
| Comparative Example 5 | 1.6 | 0.14 | 5.2 |
| Comparative Example 6 | 1.6 | 0.22 | 13.5 |

| Examples and Comparative Examples | 3rd Discharge capacity (mAh/g) | 25th Discharge capacity (mAh/g) | 25th Discharge capacity/3rd discharge capacity (%) |
|---|---|---|---|
| Example 1 | 240 | 229 | 95.4 |
| Example 2 | 241 | 230 | 95.4 |
| Example 3 | 238 | 226 | 95.0 |
| Example 4 | 230 | 214 | 93.0 |
| Example 5 | 231 | 214 | 92.6 |
| Example 6 | 225 | 205 | 91.1 |
| Example 7 | 222 | 202 | 91.0 |
| Example 8 | 245 | 234 | 95.5 |
| Example 9 | 240 | 229 | 95.4 |
| Example 10 | 226 | 211 | 93.4 |
| Example 11 | 253 | 241 | 95.3 |
| Example 12 | 241 | 229 | 95.0 |
| Example 13 | 240 | 229 | 95.4 |
| Comparative Example 1 | 169 | 148 | 87.6 |
| Comparative Example 2 | 239 | 201 | 84.1 |
| Comparative Example 3 | 189 | 165 | 87.3 |
| Comparative Example 4 | 188 | 154 | 81.9 |
| Comparative Example 5 | 176 | 143 | 81.3 |
| Comparative Example 6 | 198 | 172 | 86.9 |

In any of the positive electrode active substance particles obtained in Examples 1 to 13, the 3rd discharge capacity thereof was not less than 200 mA/g, and the ratio in percent of the 25th discharge capacity to the 3rd discharge capacity was not less than 90%. Thus, it was confirmed that the positive electrode active substance particles obtained according to the present invention had a large discharge capacity owing to the presence of the crystal structure belonging to a space group of 2C/m, and further the reaction thereof with an electrolyte solution upon charging and discharging was suppressed owing to the boron added thereto. Therefore, the positive electrode active substance particles according to the present were positive electrode materials having a high discharge capacity and excellent cycle characteristics.

Example 14

By using the same sample as prepared in Example 1, the same evaluation procedure as defined in Example 1 was conducted except that the charging voltage was changed from 4.6 V to 4.55 V.

Example 15

By using the same sample as prepared in Example 2, the same evaluation procedure as defined in Example 2 was conducted except that the charging voltage was changed from 4.6 V to 4.45 V.

The cycle characteristics of the positive electrode active substance particles obtained in Examples 14 and 15 when varying the charging voltage thereof are shown in Table 2 below.

TABLE 2

| | 3rd Discharge capacity (mAh/g) | 25th Discharge capacity (mAh/g) | 25th Discharge capacity/3rd discharge capacity (%) |
|---|---|---|---|
| Example 14 | 232 | 227 | 97.8 |
| Example 15 | 224 | 221 | 98.7 |

From the results of Examples 14 and 15, it was confirmed that when the charging voltage was reduced, it was possible to attain good cycle characteristics.

From the above results, it was confirmed that the positive electrode active substance particles according to the present invention exhibited a large charge/discharge capacity and excellent cycle characteristics, and therefore were useful as a positive electrode active substance particles for non-aqueous secondary batteries.

INDUSTRIAL APPLICABILITY

The positive electrode active substance particles according to the present invention have a large charge/discharge capacity and excellent cycle characteristics, and therefore can be suitably used as a positive electrode active substance for non-aqueous secondary batteries.

The invention claimed is:

1. Positive electrode active substance particles comprising a compound having at least a crystal system belonging to a space group of R–3m and a crystal system belonging to a space group of C2/m, and boron,
which compound is a composite oxide comprising at least Li, Mn, and Co and/or Ni;
which positive electrode active substance particles whose relative intensity ratio [(a)/(b)] of a maximum diffraction peak intensity (a) observed at $2\theta=20.8\pm1°$ in a powder X-ray diffraction pattern of the positive electrode active substance as measured using a Cu-Ka ray to a maximum diffraction peak intensity (b) observed at $2\theta=18.6\pm1°$ in the powder X-ray diffraction pattern, is 0.02 to 0.5;
a content of Mn in the positive electrode active substance particles being controlled such that a molar ratio of Mn/(Ni+Co+Mn) therein is not less than 0.56; and
which positive electrode active substance particles comprise the boron in an amount of 0.001 to 3% by weight, wherein the positive electrode active substance particles have a molar ratio of Li/(Ni+Co+Mn) of 1.23 to 1.7.

2. Positive electrode active substance particles according to claim 1, wherein the positive electrode active substance particles comprise $LiM_xMn_{1-x}O_2$ wherein M is Ni and/or Co; $0<x\leq1$, as a compound having a crystal system belonging to a space group of R–3m, and $Li_2M'_{(1-y)}Mn_yO_3$ wherein M' is Ni and/or Co; $0<y\leq1$, as a compound having a crystal system belonging to a space group of C2/m.

3. Positive electrode active substance particles according to claim 1, wherein the positive electrode active substance particles have a specific surface area of 0.05 to 20 $m^2/g$ as measured by a BET method.

4. Positive electrode active substance particles according to claim 1, wherein the positive electrode active substance particles are in the form of secondary particles produced by aggregating primary particles thereof in which the primary particles have an average primary particle diameter of not more than 3 μm, and the secondary particles have an average secondary particle diameter of 1 to 50 μm.

5. A process for producing the positive electrode active substance particles as defined in claim 1, comprising the step of calcining a mixture comprising precursor particles comprising Mn, and Ni and/or Co, a lithium compound and a boron compound at a temperature of 500 to 1500° C., wherein a content of Mn in the precursor particles comprising Mn, and Ni and/or Co is controlled such that a molar ratio of Mn/(Ni+Co+Mn) therein is not less than 0.56.

6. A non-aqueous electrolyte secondary battery comprising a positive electrode comprising the positive electrode active substance particles as defined in claim 1.

* * * * *